(12) United States Patent
Frederiksen

(10) Patent No.: US 8,241,598 B2
(45) Date of Patent: Aug. 14, 2012

(54) TEMPERATURE CONTROL CIRCUIT FOR SCR UREA SYSTEM

(75) Inventor: Stephen Frederiksen, Dearborn Heights, MI (US)

(73) Assignee: DENSO International America, Inc., Southfield, MI (US)

(*) Notice: Subject to any disclaimer, the term of this patent is extended or adjusted under 35 U.S.C. 154(b) by 53 days.

(21) Appl. No.: 12/983,667

(22) Filed: Jan. 3, 2011

(65) Prior Publication Data
US 2011/0243818 A1 Oct. 6, 2011

Related U.S. Application Data

(60) Provisional application No. 61/319,798, filed on Mar. 31, 2010.

(51) Int. Cl.
*B01D 53/34* (2006.01)
*B01D 53/56* (2006.01)
*B01D 53/94* (2006.01)
*F01N 3/18* (2006.01)

(52) U.S. Cl. .................. 423/212; 423/213.2; 423/239.1; 423/DIG. 6; 422/105; 422/109; 422/168; 422/198; 165/41; 165/104.19; 60/295; 60/299

(58) Field of Classification Search .................. 423/212, 423/213.2, 239.1, DIG. 6; 422/105, 109, 422/168, 198; 165/41, 104.19; 60/295, 299
See application file for complete search history.

(56) References Cited

U.S. PATENT DOCUMENTS

| 6,063,350 | A | 5/2000 | Tarabulski et al. |
| 6,314,722 | B1 | 11/2001 | Matros et al. |
| 6,810,661 | B2 | 11/2004 | Lambert et al. |
| 2012/0045378 | A1* | 2/2012 | Soukhojak et al. ........... 423/212 |

FOREIGN PATENT DOCUMENTS

| JP | 2006-316684 | 11/2006 |
| JP | 2008-524487 | 7/2008 |
| JP | 2009-228616 | 10/2009 |

* cited by examiner

*Primary Examiner* — Timothy Vanoy
(74) *Attorney, Agent, or Firm* — Harness, Dickey & Pierce, PLC

(57) ABSTRACT

A system may include a urea injection device, first, second and third conduits and a valve. The first conduit may contain a fluid and may be in heat transfer relation with the urea injection device. The second conduit may be in selective fluid communication with the first conduit. The third conduit may be in selective fluid communication with the first conduit and in heat transfer relation with a heat source. The valve may be connected to the first, second and third conduits and may be movable between first and second positions. The first position may allow fluid communication between the first and third conduits and restrict communication between the first and second conduits. The second position may allow fluid communication between the first and second conduits and restrict fluid communication between the first and third conduits.

20 Claims, 2 Drawing Sheets

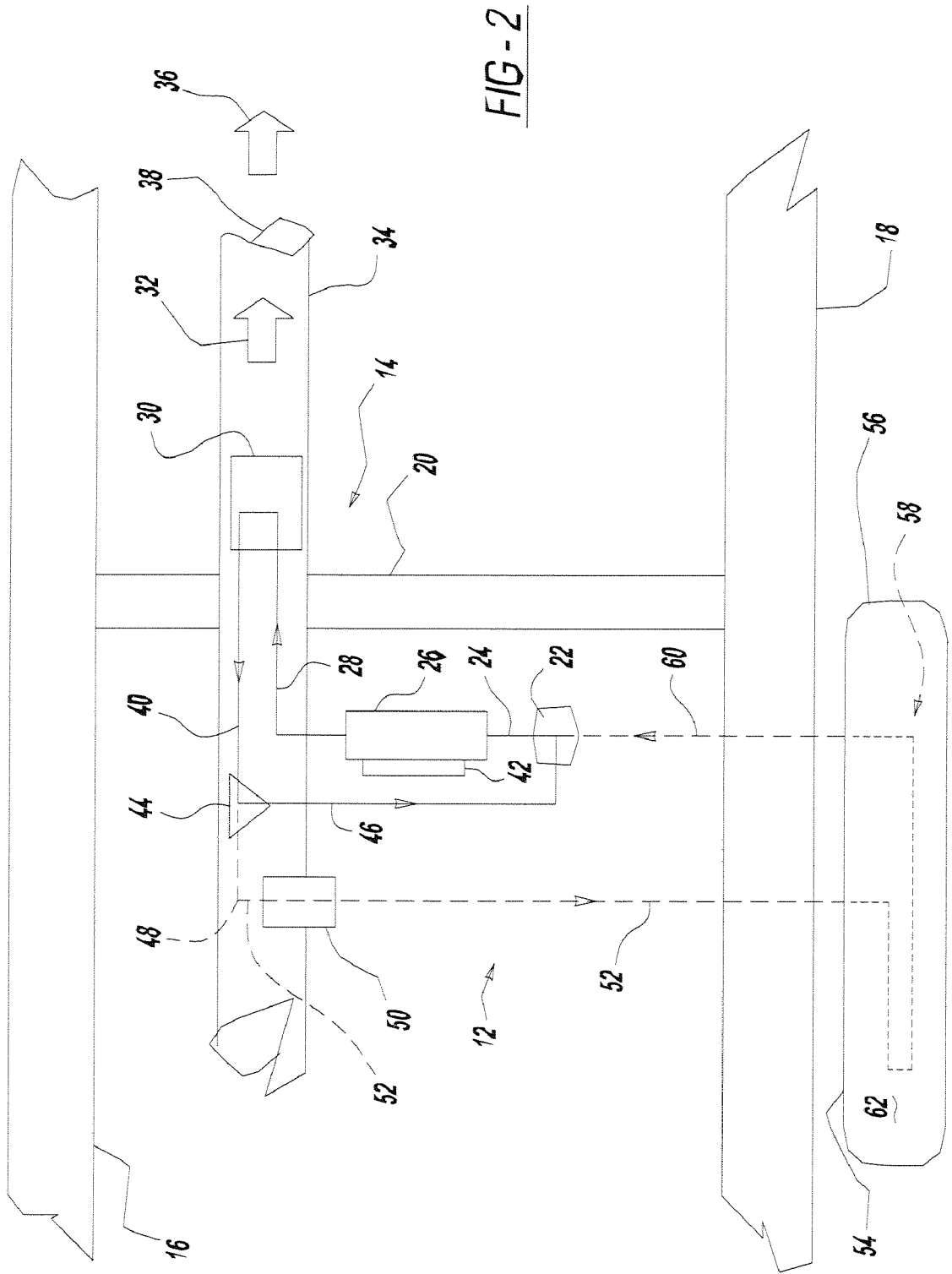

TEMPERATURE CONTROL CIRCUIT FOR SCR UREA SYSTEM

CROSS-REFERENCE TO RELATED APPLICATIONS

This application claims the benefit of U.S. Provisional Application No. 61/319,798, filed on Mar. 31, 2010. The entire disclosure of the above application is incorporated herein by reference.

FIELD

The present disclosure relates to a temperature control circuit for a selective catalytic reduction urea system.

BACKGROUND

This section provides background information related to the present disclosure and is not necessarily prior art. Some automotive vehicles and other machines powered by an internal combustion engine may include a selective catalytic reduction (SCR) system in which a substance such as urea, for example, is injected into exhaust gas discharged by the engine. The urea reacts with the exhaust gas and converts harmful pollutants in the exhaust gas to more benign compounds, thereby subjecting the environment to fewer pollutants than without urea injection.

Urea is susceptible to freezing in cold weather and can be adversely affected by extreme heat generated by the engine and/or other vehicle systems. A temperature control system may be provided to maintain the urea within a predetermined temperature range.

SUMMARY

This section provides a general summary of the disclosure, and is not a comprehensive disclosure of its full scope or all of its features. In one form, the present disclosure provides a system that may employ a urea injection device, a first conduit containing a fluid that is in heat transfer relation with the urea injection device. A second conduit may be in selective fluid communication with the first conduit and a third conduit may be in selective fluid communication with the first conduit and in heat transfer relation with a heat source. A valve may be directly or indirectly connected to the first, second and third conduits and movable to a first position that allows fluid communication between the first and third conduits and that restricts or prevents communication between the first and second conduits. The valve may be movable to a second position that allows fluid communication between the first and second conduits and that restricts or prevents fluid communication between the first and third conduits. The system may further employ a heat exchanger that is disposed upstream from the urea injection device and that is in fluid communication with the first conduit. The heat exchanger may transfer heat from the fluid to ambient air. The system may further employ a liquid fluid pump to circulate the fluid through the first, second and third conduits. A urea tank may contain urea for supply to the urea injection device. The third conduit may include a warming loop of conduit disposed within the urea tank and in heat transfer relation with the urea in the urea tank. The heat source may include exhaust gases discharged from an engine exhaust. The heat source may include a heat jacket in heat transfer relation with an engine exhaust pipe through which the exhaust gas flows. The valve may be in the first position when ambient air is less than or equal to about twelve degrees Fahrenheit. The valve may move from the first position to the second position when the ambient air rises above about twelve degrees Fahrenheit.

A temperature control circuit may employ a pump circulating a fluid throughout the circuit, a first tube receiving the fluid from the pump, the first tube being in heat transfer relation with an exhaust gas, and a second tube located within a urea tank and receiving the fluid from the first tube and transferring heat from the fluid to urea within the urea tank and returning the fluid to the pump. The temperature control circuit may further employ a bypass conduit selectively receiving the fluid from the first tube and allowing the fluid to bypass the urea tank and return to the first tube. A valve may be movable between a first position allowing the fluid into the bypass conduit and restricting fluid from flowing into the second tube and a second position allowing the fluid into the second tube and restricting flow into the bypass conduit. The first tube is located over an exhaust pipe to warm the fluid. A heat jacket may be in heat transfer relation (i.e., may transfer heat) with the first tube. A heat exchanger in fluid communication with the first tube and disposed upstream from a urea injection device, the heat exchanger extracting heat from the fluid prior to reaching the urea injection device. The valve is in the first position when an ambient air is less than or equal to about twelve degrees Fahrenheit and moves from the first position to the second position when the ambient air rises above about twelve degrees Fahrenheit.

A method of operating the above described disclosure may include injecting a substance into a flow of exhaust gas discharged by an internal combustion engine, wherein the substance regulates emissions, transferring heat from the exhaust gas to a heat transfer fluid circulating through a fluid circuit, and transferring heat from the heat transfer fluid to a volume of the substance disposed in a tank in which the substance is stored. The method may further include moving a valve disposed upstream of the tank to allow a flow of the heat transfer fluid through a conduit disposed in the tank. A bypass conduit may be provided and be in communication with the valve and selectively allowing the heat transfer fluid to bypass the tank. The method may further entail transferring heat from the heat transfer fluid to ambient air. The step of transferring heat from the exhaust gas to the heat transfer fluid may include allowing the heat transfer fluid to flow through a tube disposed above an exhaust pipe through which the exhaust gas flows.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is an enlarged view of the cooling circuit for an SCR urea system in accordance with the present disclosure.

Corresponding reference numerals indicate corresponding parts throughout the several views of the drawings.

DETAILED DESCRIPTION

Example embodiments will now be described more fully with reference to FIGS. 1-3 of the accompanying drawings.

Figure 1:
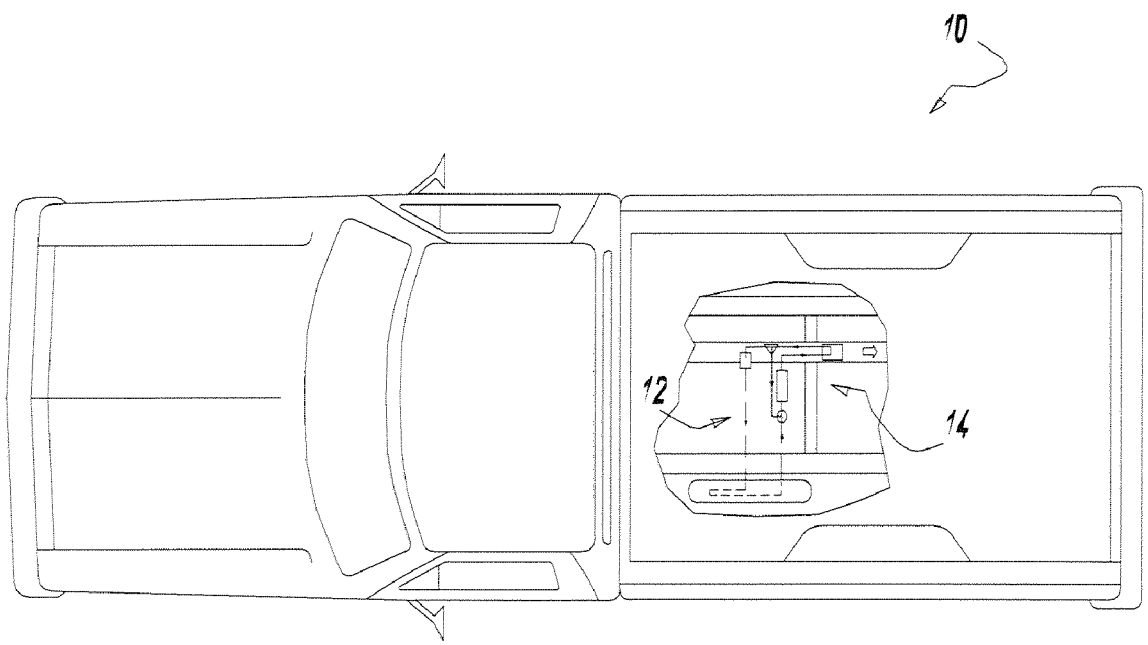
FIG. 1 is a top view of a vehicle depicting an example location of a cooling circuit for an SCR urea system in accordance with the present disclosure.

Turning first to FIG. 1, a vehicle 10 may be equipped with a selective catalytic reduction urea system ("SCRUS") warming circuit 12 and a SCRUS cooling circuit 14 to heat and cool, respectively, portions of SCRUS (not shown). More specifically and with reference to FIG. 2, SCRUS cooling circuit 14 may be located between a passenger side frame rail 16 and a driver side frame rail 18. A structural cross-member 20 may join frame rails 16, 18. SCRUS warming circuit 12 and SCRUS cooling circuit 14 may employ an electric pump 22, hereinafter referred to as a "pump," that pumps a fluid, such as a liquid coolant through a tube 24 from pump 22 to a heat exchanger 26. For purposes of illustration and discussion, the liquid coolant or "coolant" used throughout this description may be generically referred to as "glycol," but may be any of a class of organic compounds belonging to the alcohol family. Ethylene Glycol is a specific example of a liquid glycol anti-freeze and coolant that may be used with the teachings of the present disclosure.

Continuing, after being pumped into heat exchanger 26, the coolant may flow out of heat exchanger 26 and into tube 28 before reaching a doser area 30, which may employ a doser. As is known, the doser may be a liquid injector that injects liquid urea into an exhaust stream 32, such as a diesel exhaust stream within an exhaust pipe 34, so that treated exhaust 36 exiting an outlet 38 of exhaust pipe 34 may be reduced of environmentally harmful emissions.

Tube 28 and a tube 40 may be located above doser area 30 and may be arranged such that tube 28 may transport cooled liquid coolant to doser area 30 to cool an injector or doser resident within exhaust pipe 34 at doser area 30. Further, tube 40 may be secured physically against exhaust pipe 34 or reside with a space between tube 40 and exhaust pipe 34. The liquid coolant flowing in tube 28 to doser area 30 may be cooler or lower in temperature than the liquid coolant before the liquid coolant passes through heat exchanger 26 because heat exchanger 26 removes heat from the liquid coolant. Tube 28 may physically touch an injector or doser in a SCRUS to facilitate cooling of the doser. Heat exchanger 26 may be equipped with a cooling fan 42 depending upon the cooling requirements of the particular SCRUS cooling circuit 14 necessary based upon the heat load at doser area 30. Because tube 40 may be located above doser area 30, liquid coolant flowing through tube 40 may absorb heat from the doser.

Tube 40 may be directed into a valve 44, which may direct liquid coolant in one of two directions. Although valve 44 may be normally closed, such that liquid coolant normally passes into a tube 46 of SCRUS cooling circuit 14, valve 44 may also direct liquid coolant into a tube 48 when, for example, an outside ambient temperature is less than or equal to 12 degrees F. (approximately −11 degrees C.). Tube 46 may be part of SCRUS cooling circuit 14 and may lead directly back to pump 22.

Alternatively, tube 48 may be part of SCRUS warming circuit 12 and lead to a heat jacket 50. Heat jacket 50 may facilitate heat transfer from exhaust pipe 34 into liquid coolant flowing in a tube 52, part of which may be surrounded by heat jacket 50. Heat jacket 50 may be completely above exhaust pipe 34 or partly above exhaust pipe 34. "Above" means relative to how vehicle 10 may traditionally reside upon a surface. That is, the ground upon which vehicle 10 may reside may be below exhaust pipe 34 and heat jacket 50 may then be located on an opposite side (i.e. above) of exhaust pipe 34 as the ground upon which vehicle 10 resides.

Upon exiting from heat jacket 50, tube 52 may transition at a tank wall 54 of a urea tank 56 and form a warming loop 58 within urea tank 56 before again transitioning at tank wall 54 to form a tube 60, which returns the liquid coolant to pump 22. That is, warming loop 58 may be a section of tubing carrying liquid coolant throughout an interior volume of urea tank 56.

In order of flow out of pump 22, SCRUS cooling circuit 14 utilizes pump 22, tube 24, heat exchanger 26, tube 28, tube 40, valve 44, and pipe 46 before returning liquid coolant to pump 22. In order of flow out of pump 22, SCRUS warming circuit 12 utilizes pump 22, tube 24, heat exchanger 26, tube 28, tube 40, valve 44, tube 52, heat jacket 50, tube 52, warming loop 58, and tube 60 before returning liquid coolant to pump 22. Thus, valve 44 engages and disengages use of SCRUS warming circuit 12. SCRUS warming circuit 12 may be utilized to provide heat to a volume of urea 62 within urea tank 56 to elevate and maintain a temperature of the volume of urea 62 to above 32 degrees F. (0 degrees C.). It should be understood that the volume of urea 62 may include any concentration of urea admixed as is known in the art (e.g., urea and de-ionized water mixture).

Figure 3:
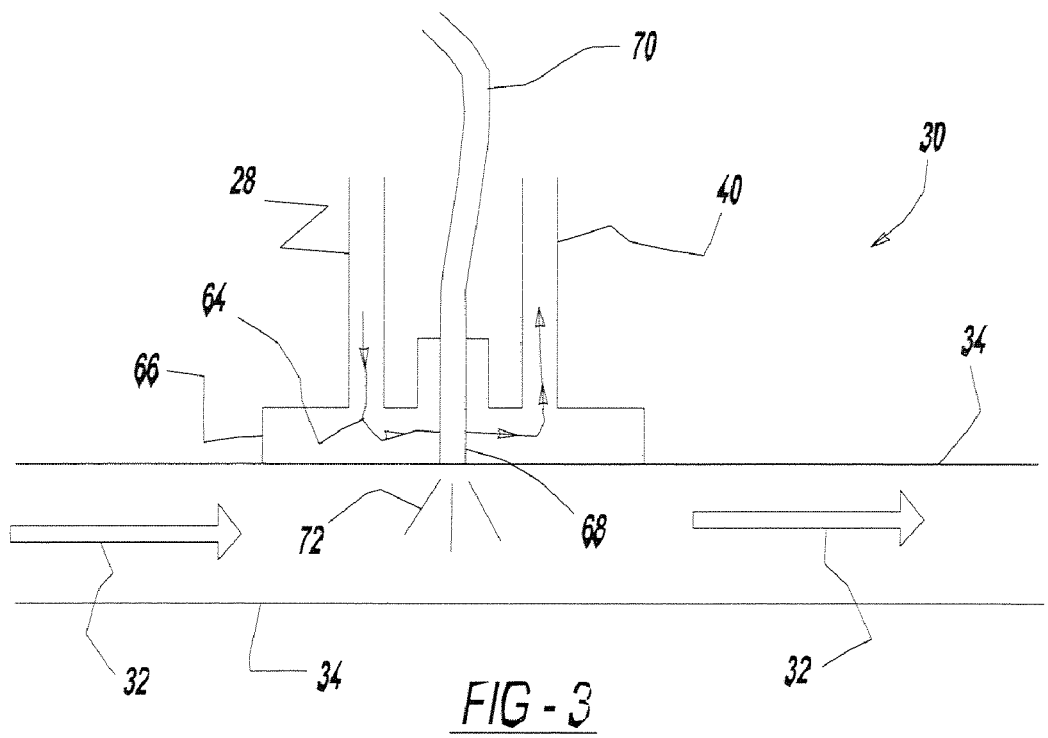
FIG. 3 is a cross-sectional view of a doser in accordance with teachings of the present disclosure.

FIG. 3 depicts doser area 30 in which tube 28 contains and routes a liquid coolant 64 into and through a doser head 66 before routing liquid coolant 64 into tube 40. While passing through doser head 66, liquid coolant 64 warms an injector or nozzle 68 of a urea line 70 to warm a urea mixture 72 before it is injected into exhaust stream 32 flowing through exhaust pipe 34.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:
1. A system comprising:
a urea injection device;
a first conduit containing a fluid and in heat transfer relation with the urea injection device;

a second conduit in selective fluid communication with the first conduit;

a third conduit in selective fluid communication with the first conduit and in heat transfer relation with a heat source; and a valve connected to the first, second and third conduits and movable between a first position allowing fluid communication between the first and third conduits and restricting communication between the first and second conduits and a second position allowing fluid communication between the first and second conduits and restricting fluid communication between the first and third conduits.

2. The system of claim 1, further comprising a heat exchanger in fluid communication with the first conduit and disposed upstream from the urea injection device, the heat exchanger transferring heat from the fluid to ambient air.

3. The system of claim 1, further comprising a pump in fluid communication with the first, second and third conduits and circulating the fluid therethrough.

4. The system of claim 1, further comprising a urea tank supplying urea to the urea injection device, wherein the third conduit includes a warming loop disposed within the urea tank and in heat transfer relation with the urea in the urea tank.

5. The system of claim 1, wherein the heat source includes an exhaust gas discharged from an engine.

6. The system of claim 5, wherein the heat source includes a heat jacket in heat transfer relation with an exhaust pipe through which the exhaust gas flows.

7. The system of claim 1, wherein the valve is in the first position when an ambient air is less than or equal to about twelve degrees Fahrenheit.

8. The system of claim 7, wherein the valve moves from the first position to the second position when the ambient air rises above about twelve degrees Fahrenheit.

9. A temperature control circuit comprising:

a pump circulating a fluid throughout the circuit;

a first tube receiving the fluid from the pump, the first tube being in heat transfer relation with an exhaust gas; and a second tube located within a urea tank and receiving the fluid from the first tube and transferring heat from the fluid to urea within the urea tank and returning the fluid to the pump.

10. The temperature control circuit of claim 9, further comprising a bypass conduit selectively receiving the fluid from the first tube and allowing the fluid to bypass the urea tank and return to the first tube.

11. The temperature control circuit of claim 10, further comprising a valve movable between a first position allowing the fluid into the bypass conduit and restricting fluid from flowing into the second tube and a second position allowing the fluid into the second tube and restricting flow into the bypass conduit.

12. The temperature control circuit of claim 9, wherein the first tube is located over an exhaust pipe to warm the fluid.

13. The temperature control circuit of claim 12, further comprising a heat jacket in heat transfer relation with the first tube.

14. The temperature control circuit of claim 9, further comprising a heat exchanger in fluid communication with the first tube and disposed upstream from a urea injection device, the heat exchanger extracting heat from the fluid prior to reaching the urea injection device.

15. The temperature control circuit of claim 9, wherein the valve is in the first position when an ambient air is less than or equal to about twelve degrees Fahrenheit and moves from the first position to the second position when the ambient air rises above about twelve degrees Fahrenheit.

16. A method comprising:

injecting a substance into a flow of exhaust gas discharged by an internal combustion engine, wherein the substance regulates emissions;

transferring heat from the exhaust gas to a heat transfer fluid circulating through a fluid circuit; and transferring heat from the heat transfer fluid to a volume of the substance disposed in a tank in which the substance is stored.

17. The method of claim 16, further comprising moving a valve disposed upstream of the tank to allow a flow of the heat transfer fluid through a conduit disposed in the tank.

18. The method of claim 17, further comprising providing a bypass conduit in communication with the valve and selectively allowing the heat transfer fluid to bypass the tank.

19. The method of claim 18, further comprising transferring heat from the heat transfer fluid to ambient air.

20. The method of claim 16, wherein the step of transferring heat from the exhaust gas to the heat transfer fluid includes allowing the heat transfer fluid to flow through a tube disposed above an exhaust pipe through which the exhaust gas flows.

* * * * *